(12) United States Patent
Fornage

(10) Patent No.: US 7,855,473 B2
(45) Date of Patent: Dec. 21, 2010

(54) APPARATUS FOR PHASE ROTATION FOR A THREE-PHASE AC CIRCUIT

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 306 days.

(21) Appl. No.: 12/075,342

(22) Filed: Mar. 11, 2008

(65) Prior Publication Data

US 2009/0230782 A1    Sep. 17, 2009

(51) Int. Cl.
   *H02J 1/00*    (2006.01)
(52) U.S. Cl. ........................................ 307/82
(58) Field of Classification Search ............... 307/14, 307/82
   See application file for complete search history.

(56) References Cited

U.S. PATENT DOCUMENTS 5,886,890 A    3/1999    Ishida et al.

7,646,109 B2 *    1/2010    Belady et al. ................. 307/14
2009/0000654 A1 *    1/2009    Rotzoll et al. ................ 136/244

OTHER PUBLICATIONS

Xiao, Weidong, "Topology Study of Photovoltaic Interface for Maximum Power Point Tracking," *IEEE Transactions on Industrial Electronics*, vol. 54, No. 3, Jun. 2007, pp. 1696-1704.
"Inverters, Converters, Controllers and Interconnection System Equipment for Use With Distributed Energy Resources," *Underwriters Laboratories Inc.*, UL Standard 1741.1, May 7, 1999, downloaded from web site http://ulstandardsinfonet.ul.com/scopes/1741.html on Jun. 11, 2008.
"IEEE Standard for Interconnecting Distributed Resources with Electric Power Systems," IEEE Standard 1547-2003, *IEEE*, Jul. 28, 2003.

* cited by examiner

*Primary Examiner*—Michael Rutland Wallis
(74) *Attorney, Agent, or Firm*—Moser IP Law Group

(57) ABSTRACT

An apparatus for providing phase rotation for a three-phase AC circuit. The apparatus comprises three phase input terminals and three phase output terminals, where a first phase input terminal is coupled with a third phase output terminal; a second phase input terminal is coupled with a first phase output terminal; and a third phase input terminal is coupled with a second phase output terminal.

9 Claims, 3 Drawing Sheets

APPARATUS FOR PHASE ROTATION FOR A THREE-PHASE AC CIRCUIT

BACKGROUND OF THE INVENTION

1. Field of the Invention

Embodiments of the present disclosure generally relate to an apparatus for providing phase rotation for a three-phase AC circuit.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ inverters to convert the DC current into an alternating current (AC) and couple the AC current to the commercial power grid. In this type of system, the power produced by the solar panels can be sold to the commercial power company.

Traditionally, solar systems have used centralized inverters, where many PV modules feed into a single large inverter for the conversion of DC current to AC current in applications such as the one described above. A recent trend has been to decentralize this DC/AC conversion by using micro-inverters. Rather than employing a single large inverter, a micro-inverter is individually coupled to each PV module. Micro-inverters improve the performance of the DC/AC power conversion by optimally extracting the maximum power from each PV module. Micro-inverters also offer the added benefit of using a connective wire bus that carries entirely AC voltage rather than the high voltage DC used in traditional centralized inverter systems, thereby offering improved safety and efficiency.

Micro-inverters are typically arranged in a string on a branch circuit from a load center. Additionally, there may be multiple branch circuits from the load center, where each branch circuit supports a string of micro-inverters and their associated PV modules. In large scale installations, it is common to use three-phase grid connections from the load center. It is not always economical though to have a true three-phase micro-inverter as it requires a substantially more electronics than a single-phase micro-inverter. Traditional methods of connecting single-phase micro-inverters in a three-phase grid connection requires three strings of micro-inverters, where each string is connected to two of the three power phases. In order to properly balance the load on each phase, an electrician needs to install the same number of micro-inverters on each branch circuit and needs to use equally all phases for all of the branch circuits. This leads to a need for extensive installation planning and longer and more cumbersome installations.

Therefore, there is a need in the art for an apparatus that can employ single-phase micro-inverters in three-phase grid connections in such a way that micro-inverter installation and load balancing on the three phases are greatly simplified.

SUMMARY OF THE INVENTION

Embodiments of the present invention generally relate to an apparatus for providing phase rotation for a three-phase AC circuit. The apparatus comprises three phase input terminals and three phase output terminals, where a first phase input terminal is coupled with a third phase output terminal; a second phase input terminal is coupled with a first phase output terminal; and a third phase input terminal is coupled with a second phase output terminal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
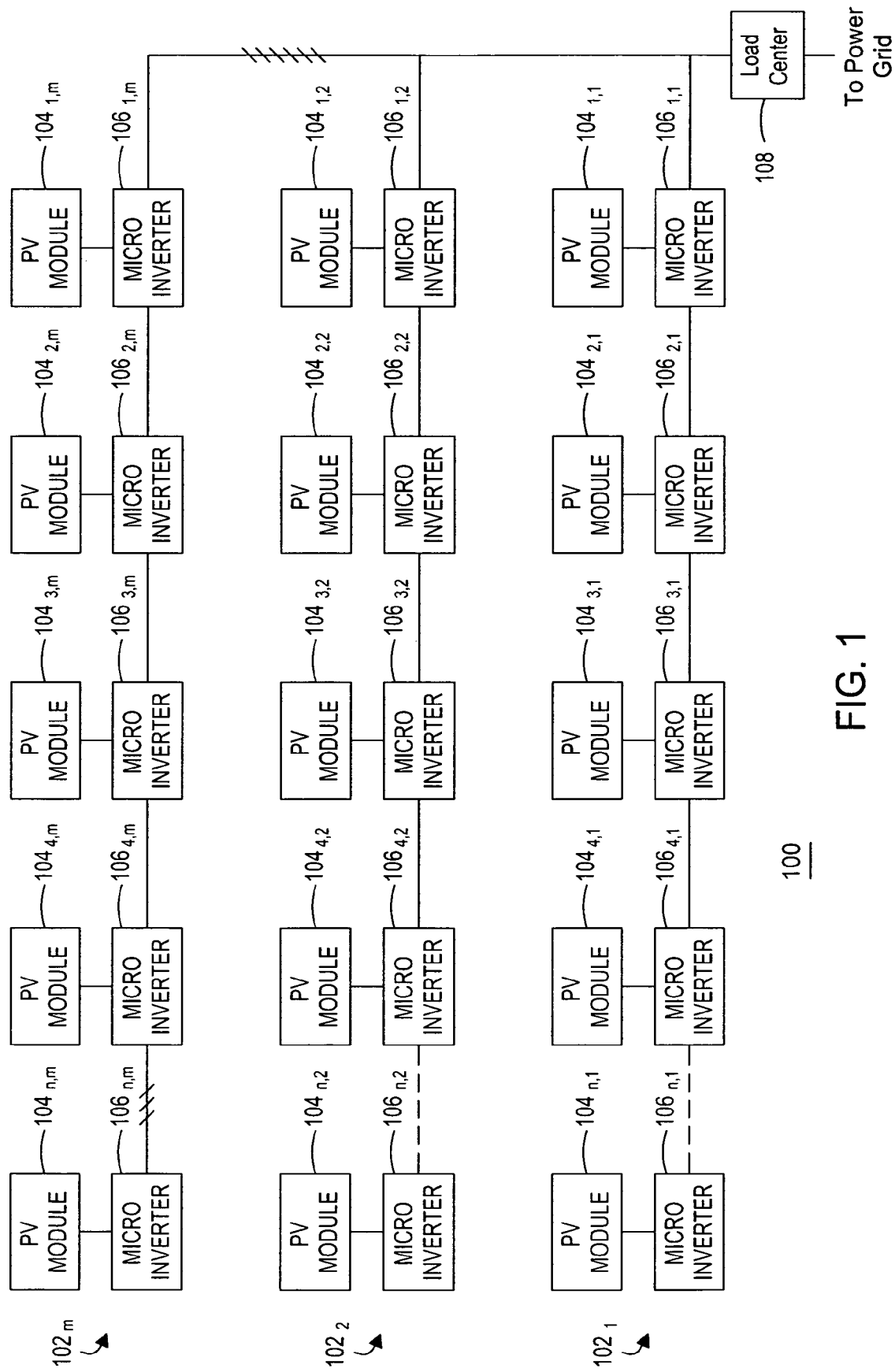
FIG. 1 is a block diagram of an exemplary system for power generation in accordance with one embodiment of the present invention.

FIG. 1 is a block diagram of an exemplary system 100 for power generation in accordance with one embodiment of the present invention. This diagram only portrays one variation of the myriad of possible system configurations. The present invention can function in a variety of power generation environments and systems.

The power generation system 100 comprises a plurality of branch circuits $102_1$, $102_2$ ... $102_m$, from a load center 108. The load center 108 houses connections between incoming power lines from a commercial power grid distribution system and the plurality of branch circuits $102_1$, $102_2$ ... $102_m$, collectively referred to as branch circuits 102. A branch circuit $102_m$ comprises a plurality of micro-inverters $106_{1,m}$, $106_{2,m}$ ... $106_{n,m}$, collectively referred to as micro-inverters 106, coupled in series. Each micro-inverter $106_{1,m}$, $106_{2,m}$ ... $106_{n,m}$ is coupled to a PV module $104_{1,m}$, $104_{2,m}$ ... $104_{n,m}$, collectively referred to as PV modules 104.

The micro-inverters 106 convert DC power generated by the PV modules 104 into AC power. The micro-inverters 106 meter out current that is in-phase with the AC commercial power grid voltage and generate such current with low distortion. The system 100 couples the generated AC power to the commercial power grid via the load center 108.

Figure 2:
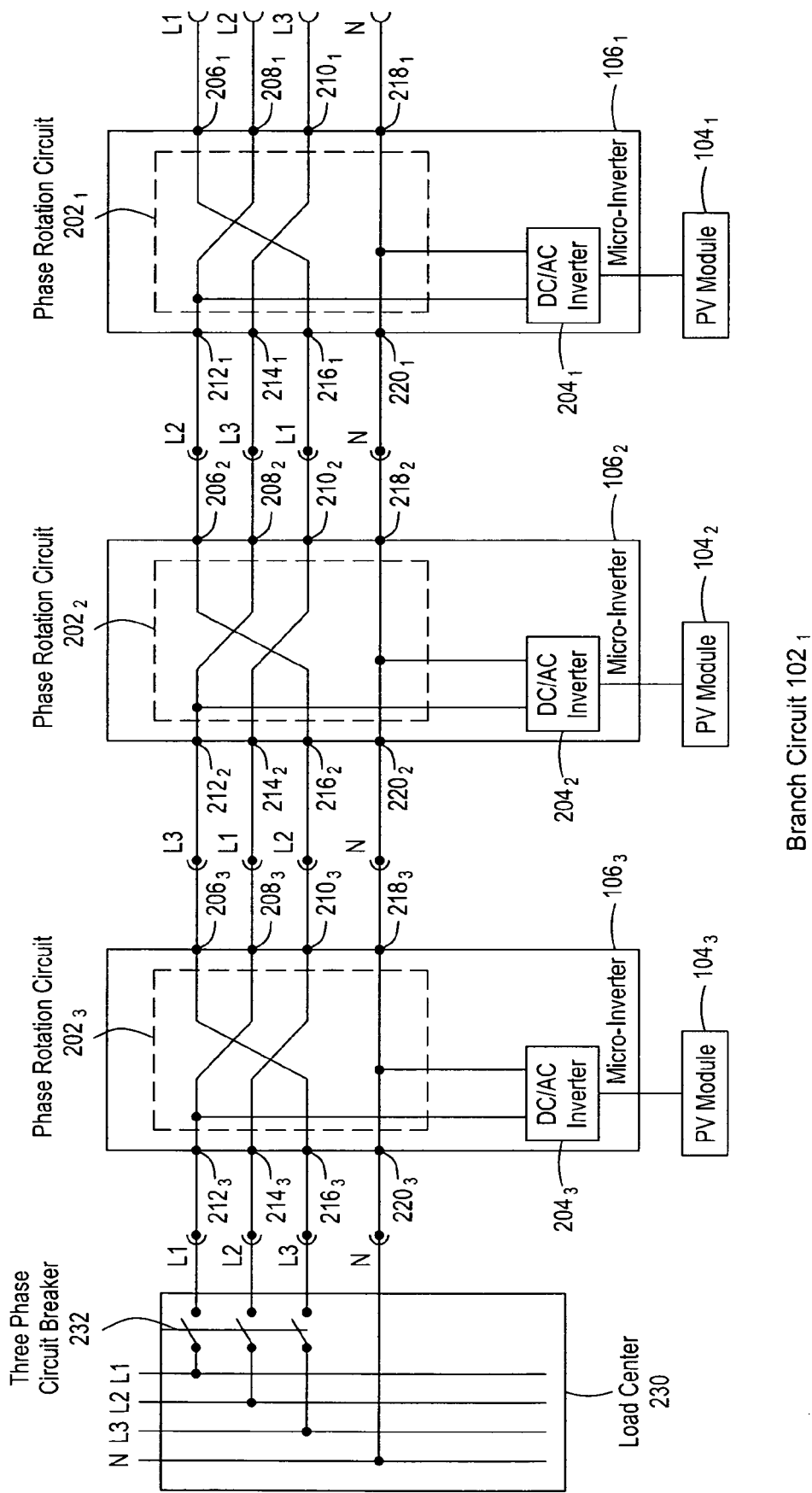
FIG. 2 is a block diagram of an exemplary string of micro-inverters coupled in series on a three-phase branch circuit in accordance with one embodiment of the present invention.

FIG. 2 is a block diagram of an exemplary string of micro-inverters 106 coupled in series on a three-phase branch circuit $102_1$ in accordance with one embodiment of the present invention. A load center 230 comprises four lines $L_1$, $L_2$, $L_3$, and N from, for example, a 277/480V commercial power grid supplying a commercial three-phase AC current (herein known as "commercial AC current"). The line $L_1$ carries a first phase of the commercial AC current (herein known as "first phase of current"), the line $L_2$ carries a second phase of the commercial AC current (herein known as "second phase of current"), and the line $L_3$ carries a third phase of the commercial AC current (herein known as "third phase of current"). The line N is a neutral line that carries a resulting current from the sum of the first, the second, and the third phases of current on the lines $L_1$, $L_2$, and $L_3$. Ideally, the first, the second, and the third phases of current on the lines $L_1$, $L_2$, and $L_3$ are equally balanced such that the magnitude of each is the same and the phases are offset from one another by 120 degrees. When the first, the second, and the third phases of current on the lines $L_1$, $L_2$, and $L_3$ are equally balanced in this manner, the resulting current on the line N is zero.

A three-phase circuit breaker 232 is coupled to the load center 230 to create a 4-line branch circuit $102_1$. The branch circuit $102_1$ comprises the lines $L_1$, $L_2$, $L_3$, and N, a micro-inverter $106_1$, a micro-inverter $106_2$, and a micro-inverter $106_3$, where the micro-inverters $106_1$, $106_2$, and $106_3$ are coupled in a series configuration to the lines $L_1$, $L_2$, $L_3$, and N.

The micro-inverter $106_1$ comprises a phase rotation circuit $202_1$, a single-phase DC/AC inverter $204_1$, input terminals $206_1$, $208_1$, $210_1$, a neutral input terminal $218_1$, output terminals $212_1$, $214_1$, $216_1$, and a neutral output terminal $220_1$. The micro-inverter $106_2$ and the micro-inverter $106_3$ are identical to the micro-inverter $106_1$. Coupling the micro-inverters $106_1$, $106_2$, and $106_3$ in the series configuration is as simple as coupling the output terminals 212, 214, 216, and the neutral output terminal 220 of one micro-inverter 106 to the input terminals 206, 208, 210, and the neutral input terminal 218 respectively of a next micro-inverter 106 in the series. At the load center 230, the lines $L_1$, $L_2$, and $L_3$ are coupled via the three-phase circuit breaker 232 to the output terminals $212_3$, $214_3$, and $216_3$ respectively of the micro-inverter $106_3$; the line N is coupled to the neutral output terminal $220_3$ of the micro-inverter $106_3$. At the micro-inverter $106_1$, the input terminals $206_1$, $208_1$, $210_1$, and the neutral input terminal $218_1$ remain uncoupled. Additionally, the micro-inverters $106_1$, $106_2$, and $106_3$ are each coupled to a PV module $104_1$, $104_2$, and $104_3$ respectively.

At the micro-inverter $106_1$, the output terminals $212_1$, $214_1$, $216_1$, and the neutral output terminal $220_1$ are coupled to the lines $L_2$, $L_3$, $L_1$, and N respectively via the micro-inverters $106_2$ and $106_3$. The DC/AC inverter $204_1$ injects a single phase of AC current through the output terminal $212_1$ onto the line $L_2$. The DC/AC inverter $204_1$ matches the phase of the injected AC current to the second phase of current that is present on the line $L_2$.

Downstream of the output of the micro-inverter $106_1$, the lines $L_2$, $L_3$, $L_1$, and N are coupled to the input terminals $206_2$, $208_2$, $210_2$, and the neutral input terminal $218_2$ respectively of the micro-inverter $106_2$. The phase rotation circuit $202_2$ couples the input terminals $206_2$, $208_2$, $210_2$, and the neutral input terminal $218_2$ to the output terminals $216_2$, $212_2$, $214_2$, and the neutral output terminal $220_2$ respectively; the lines $L_3$, $L_1$, $L_2$, and N are therefore coupled to the output terminals $212_2$, $214_2$, $216_2$, and the neutral output terminal $220_2$ respectively. The DC/AC inverter $204_2$ injects a single phase of AC current through the output terminal $212_2$ onto the line $L_3$. The DC/AC inverter $204_2$ matches the phase of the injected AC current to the third phase of current that is present on the line $L_3$.

Downstream of the output of the micro-inverter $106_2$, the lines $L_3$, $L_1$, $L_2$, and N are coupled to the input terminals $206_3$, $208_3$, $210_3$, and the neutral input terminal $218_3$ respectively of the micro-inverter $106_3$. The phase rotation circuit $202_3$ couples the input terminals $206_3$, $208_3$, $210_3$, and the neutral input terminal $218_3$ to the output terminals $216_3$, $212_3$, $214_3$, and the neutral output terminal $220_3$ respectively; the lines $L_1$, $L_2$, $L_3$, and N are therefore coupled to the output terminals $212_3$, $214_3$, $216_3$, and the neutral output terminal $220_3$ respectively. The DC/AC inverter $204_3$ injects a single phase of AC current through the output terminal $212_3$ onto the line $L_1$. The DC/AC inverter $204_3$ matches the phase of the injected AC current to the first phase of current that is present on the line $L_1$.

As described above, each of the phase rotation circuits 202 rotates the first, the second, and the third phases of current between the micro-inverters 106 such that a different phase of AC current, phase-matched to one of the three phases of the commercial AC current, is generated by each of the micro-inverters 106. Assuming that the PV modules 104 are receiving equivalent levels of solar energy and that the subsequent AC currents produced by the DC/AC inverters 204 are equivalent in magnitude, the branch circuit $102_1$ generates an equally balanced three-phase AC current that is phase-matched to the commercial AC current. Therefore, the commercial AC current remains equally balanced when the generated three-phase AC current is injected onto the commercial power grid. In addition, a branch circuit 102 comprising a string of micro-inverters 106 coupled in series, where the total number of micro-inverters 106 in the string is a multiple of three, produces the same result in that the three-phase AC current generated by the branch circuit 102 is equally balanced. This automatic balancing of the three-phase AC current generated by the branch circuit 102 improves the efficiency of the system 100 and greatly simplifies installations.

Figure 3:
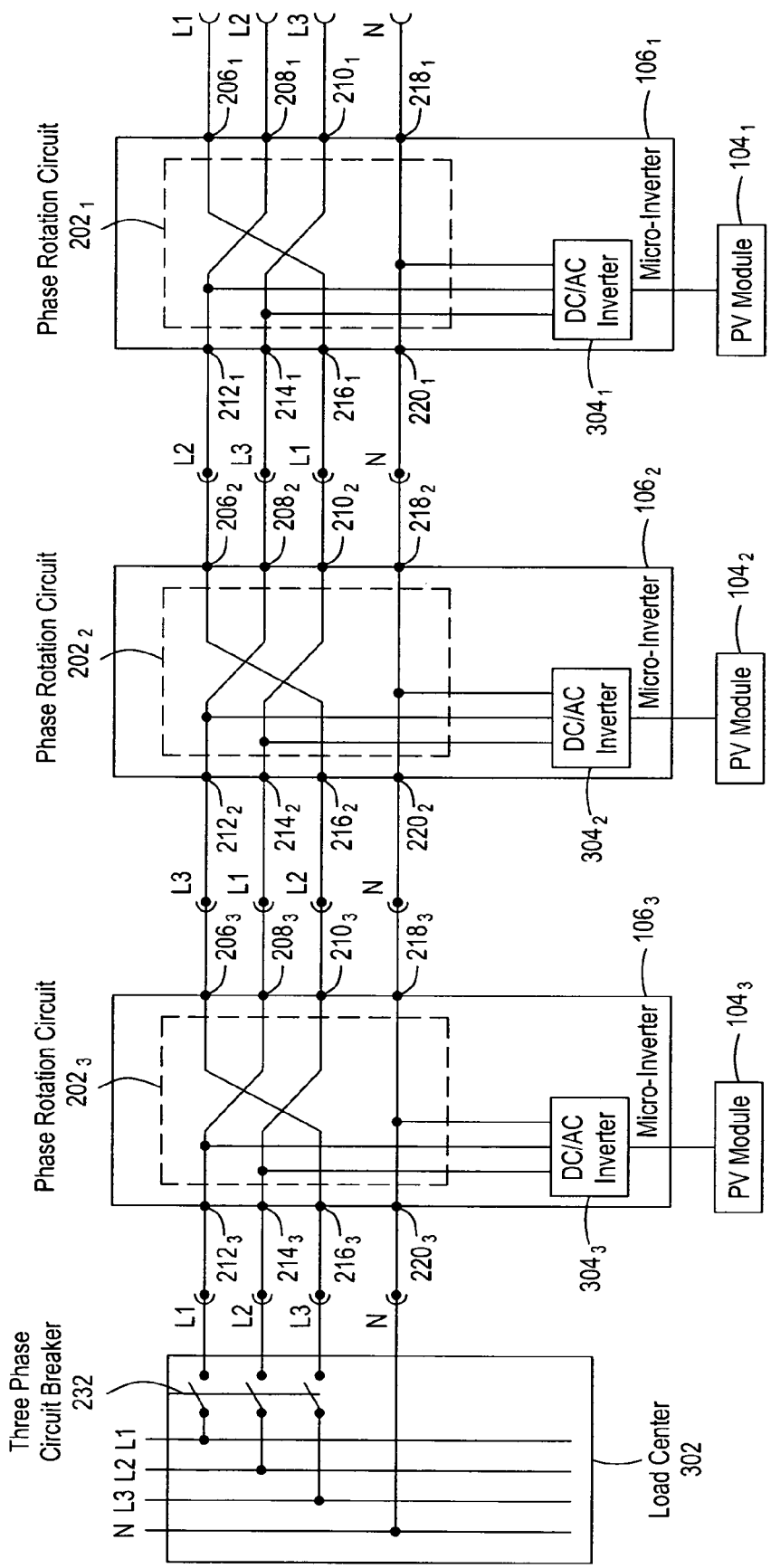
FIG. 3 is a block diagram of an exemplary string of micro-inverters coupled in series on a three-phase branch circuit in accordance with one embodiment of the present invention.

FIG. 3 is a block diagram of an exemplary string of micro-inverters 106 coupled in series on a three-phase branch circuit $102_2$ in accordance with another embodiment of the present invention. A load center 302 comprises four lines $L_1$, $L_2$, $L_3$, and N from, for example, a 120/208V commercial power grid supplying a commercial three-phase AC current (herein known as "commercial AC current"). The line $L_1$ carries a first phase of the commercial AC current (herein known as "first phase of current"), the line $L_2$ carries a second phase of the commercial AC current (herein known as "second phase of current"), and the line $L_3$ carries a third phase of the commercial AC current (herein known as "third phase of current"). The line N is a neutral line that carries a resulting current from the sum of the first, the second, and the third phases of current on the lines $L_1$, $L_2$, and $L_3$. Ideally, the first, the second, and the third phases of current on the lines $L_1$, $L_2$, and $L_3$ are equally balanced such that the magnitude of each is the same and the phases are offset from one another by 120 degrees. When the first, the second, and the third phases of current on the lines $L_1$, $L_2$, and $L_3$ are equally balanced in this manner, the resulting current on the line N is zero.

A three-phase circuit breaker 232 is coupled to the load center 302 to create a 4-line branch circuit $102_2$. The branch circuit $102_2$ comprises the lines $L_1$, $L_2$, $L_3$, and N, a micro-inverter $106_1$, a micro-inverter $106_2$, and a micro-inverter $106_3$, where the micro-inverters $106_1$, $106_2$, and $106_3$ are coupled in a series configuration to the lines $L_1$, $L_2$, $L_3$, and N.

The micro-inverter $106_1$ comprises a phase rotation circuit $202_1$, a two-phase DC/AC inverter $304_1$, input terminals $206_1$, $208_1$, $210_1$, a neutral input terminal $218_1$, output terminals $212_1$, $214_1$, $216_1$, and a neutral output terminal $220_1$. The micro-inverter $106_2$ and the micro-inverter $106_3$ are identical to the micro-inverter $106_1$. Coupling the micro-inverters $106_1$, $106_2$, and $106_3$ in the series configuration is as simple as coupling the output terminals 212, 214, 216, and the neutral output terminal 220 of one micro-inverter 106 to the input terminals 206, 208, 210, and the neutral input terminal 218 respectively of a next micro-inverter 106 in the series. At the load center 302, the lines $L_1$, $L_2$, and $L_3$ are coupled via the three-phase circuit breaker 232 to the output terminals $212_3$, $214_3$, and $216_3$ respectively of the micro-inverter $106_3$; the line N is coupled to the neutral output terminal $220_3$. At the micro-inverter $106_1$, the input terminals $206_1$, $208_1$, $210_1$, and the neutral input terminal $218_1$ remain uncoupled. Additionally, the micro-inverters $106_1$, $106_2$, and $106_3$ are each coupled to a PV module $104_1$, $104_2$, and $104_3$ respectively.

At the micro-inverter $106_1$, the output terminals $212_1$, $214_1$, $216_1$, and the neutral output terminal $220_1$ are coupled to the lines $L_2$, $L_3$, $L_1$, and N respectively via the micro-inverters $106_2$ and $106_3$. The DC/AC inverter $304_1$ injects an AC current through each of the output terminals $212_1$ and $214_1$ onto the lines $L_2$ and $L_3$ respectively. The DC/AC inverter $304_1$ matches the phases of the injected AC currents to the second and the third phases of current that are present on the lines $L_2$ and $L_3$.

Downstream of the output of the micro-inverter $106_1$, the lines $L_2$, $L_3$, $L_1$, and N are coupled to the input terminals $206_2$, $208_2$, $210_2$, and the neutral input terminal $218_2$ respectively of the micro-inverter $106_2$. The phase rotation circuit $202_2$ couples the input terminals $206_2$, $208_2$, $210_2$, and the neutral input terminal $218_2$ to the output terminals $216_2$, $212_2$, $214_2$, and the neutral output terminal $220_2$ respectively; the lines $L_3$, $L_1$, $L_2$, and N are therefore coupled to the output terminals $212_2$, $214_2$, $216_2$, and the neutral output terminal $220_2$ respectively. The DC/AC inverter $304_2$ injects an AC current through each of the output terminals $212_2$ and $214_2$ onto the lines $L_3$ and $L_1$ respectively. The DC/AC inverter $304_2$ matches the phases of the injected AC currents to the third and the first phases of current that are present on the lines $L_3$ and $L_1$.

Downstream of the output of the micro-inverter $106_2$, the lines $L_3$, $L_1$, $L_2$, and N are coupled to the input terminals $206_3$, $208_3$, $210_3$, and the neutral input terminal $218_3$ respectively of the micro-inverter $106_3$. The phase rotation circuit $202_3$ couples the input terminals $206_3$, $208_3$, $210_3$, and the neutral input terminal $218_3$ to the output terminals $216_3$, $212_3$, $214_3$, and the neutral output terminal $220_3$ respectively; the lines $L_1$, $L_2$, $L_3$, and N are therefore coupled to the output terminals $212_3$, $214_3$, $216_3$, and the neutral output terminal $220_3$ respectively. The DC/AC inverter $304_3$ injects an AC current through each of the output terminals $212_3$ and $214_3$ onto the lines $L_1$ and $L_2$ respectively. The DC/AC inverter $304_2$ matches the phases of the injected AC currents to the third and the first phases of current that are present on the lines $L_1$ and $L_2$.

As described above, the phase rotation circuits 202 rotates the first, the second, and the third phases of current between the micro-inverters 106 such that a different set of phases of AC current, where each of the phases is phase-matched to one of the three phases of the commercial AC current, is generated by each of the micro-inverters 106. Assuming that the PV modules 104 are receiving equivalent levels of solar energy and that the subsequent AC currents produced by the DC/AC inverters 304 are equivalent in magnitude, the branch circuit $102_2$ generates an equally balanced three-phase AC current that is phase-matched to the commercial AC current. Therefore, the commercial AC current remains equally balanced when the generated three-phase AC current is injected onto the commercial power grid. In addition, a branch circuit 102 comprising a string of micro-inverters 106 coupled in series, where the total number of micro-inverters 106 in the string is a multiple of three, produces the same result in that the three-phase AC current generated by the branch circuit 102 is equally balanced. This automatic balancing of the three-phase AC current generated by the branch circuit 102 improves the efficiency of the system 100 and greatly simplifies installations.

While the foregoing is directed to embodiments of the present invention, other and further embodiments of the invention may be devised without departing from the basic scope thereof, and the scope thereof is determined by the claims that follow.

The invention claimed is:

1. An apparatus for converting DC power to AC power, comprising:
   a DC to AC inverter;
   a phase rotation circuit, coupled to the DC to AC inverter, comprising (i) a first phase input terminal, a second phase input terminal, and a third phase input terminal; (ii) a first phase output terminal, a second phase output terminal, and a third phase output terminal; (iii) a first conductor coupling the first phase input terminal to the third phase output terminal, a second conductor coupling the second phase input terminal to the first phase output terminal, and a third conductor coupling the third phase input terminal to the second phase output terminal, wherein the DC to AC inverter couples power to at least one of the first, the second, or the third conductor; and (iv) a neutral conductor coupling a neutral input terminal to a neutral output terminal;
   a second phase rotation circuit; and
   a third phase rotation circuit, wherein (v) the first, the second, and the third phase output terminals are coupled to second phase rotation circuit input terminals and the neutral output terminal is coupled to a second phase rotation circuit neutral input terminal; (vi) second phase rotation circuit output terminals are coupled to third phase rotation circuit input terminals and a second phase rotation circuit neutral output terminal is coupled to a third phase rotation circuit neutral input terminal; and (vii) third phase rotation circuit output terminals and a third phase rotation circuit neutral output terminal are coupled to a fourth phase rotation circuit or to a commercial power grid.

2. The apparatus of claim 1 further comprising a photovoltaic (PV) module coupled to the DC to AC inverter.

3. The apparatus of claim 1 wherein the DC to AC inverter is further coupled to the neutral conductor.

4. The apparatus of claim 1 further comprising second and third DC to AC inverters, where the second DC to AC inverter couples power to at least one of the second phase rotation circuit output terminals and the third DC to AC inverter couples power to at least one of the third phase rotation circuit output terminals.

5. The apparatus of claim 4 further comprising at least three PV modules, where each individual PV module in the at least three PV modules is coupled to one of the DC to AC inverter, the second DC to AC inverter, or the third DC to AC inverter.

6. The apparatus of claim 5 further comprising at least three additional phase rotation circuits coupled between the third phase rotation circuit and the commercial power grid, where a total number of phase rotation circuits in the at least three additional phase rotation circuits is a multiple of three.

7. The apparatus of claim 6 where the coupling to the commercial power grid includes a three-phase circuit breaker.

8. The apparatus of claim 1, wherein the third phase rotation circuit outputs a substantially balanced three-phase AC power.

9. The apparatus of claim 8, wherein the first, the second, and the third DC to AC inverters each generate two phases of AC power.

* * * * *